Sept. 15, 1970 W. MOHAN 3,529,225
MOTOR SPEED CONTROLS
Filed June 6, 1968 2 Sheets-Sheet 1

INVENTOR
William Mohan

BY Arthur Schwartz
ATTORNEY

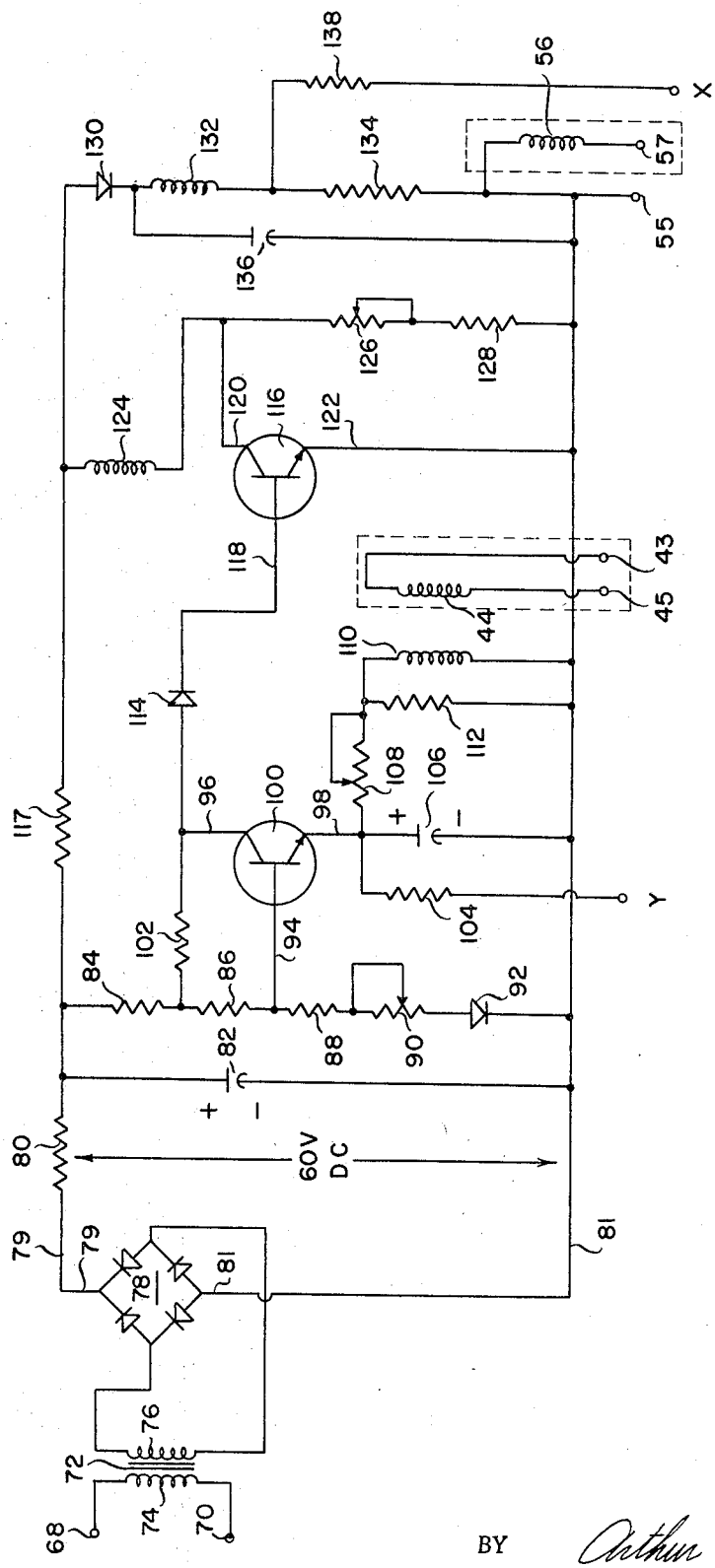

United States Patent Office 3,529,225
Patented Sept. 15, 1970

3,529,225
MOTOR SPEED CONTROLS
William Mohan, Grand Island, N.Y., assignor to Roberts Machine Rebuilders, Inc., Buffalo, N.Y., a corporation of New York
Filed June 6, 1968, Ser. No. 735,075
Int. Cl. H02p 5/18
U.S. Cl. 318—308                                    4 Claims

ABSTRACT OF THE DISCLOSURE

A motor speed control device utilizing silicon controlled rectifiers, the gates of which are controlled by the primary windings of a magnetic amplifier. Three control windings are utilized in the magnetic amplifier and a negative feedback loop and a positive feedback loop control the saturation point of the magnetic amplifier, thereby determining the firing point of the silicon controlled rectifiers.

BACKGROUND OF THE INVENTION

Field of the invention

The present invention relates to improvements in the field of load current regulation in general, and specifically in the field of motor speed control for D.C. motors operated from A.C. power sources.

Description of the prior art

A number of motor speed control devices have been developed in the prior art which utilize magnetic amplifiers to control the excitation to the armatures of the motors. Some of these devices also use silicon controlled rectifiers which are controlled by the primary windings of the magnetic amplifiers.

In one such device, a magnetic amplifier is provided with two primary, or gate, windings and three control windings. The gate windings are used to determine the firing angle of a pair of SCR's in the armature supply circuit of a D.C. motor. One of the three control windings is a "bias" winding, the energization of which is primarily controlled by the speed control potentiometer of the circuit.

A second control winding provides a negative feedback from the armature circuit and is responsive to the armature voltage. Since the feedback is negative, an increase in armature voltage will tend to cause the primary windings of the magnetic amplifier, and thereby the SCR's, to fire later in the cycle, causing a decrease in armature voltage.

The third control winding is primarily energized by a voltage induced from the current in the other windings, thereby merely exaggerating the effect of the second control winding.

OBJECTS OF THE INVENTION

An object of the present invention is to provide a motor speed control device which provides a high degree of regulation.

Another object is to provide a motor control device utilizing silicon controlled rectifiers to provide current to a motor armature.

A further object of the invention is to provide a motor control unit utilizing a magnetic amplifier to control the firing angle of a plurality of silicon controlled rectifiers.

A still further object of the invention is to provide a motor control device utilizing a magnetic amplifier, in which the magnetic amplifier contains at least three control windings and at least two feedback paths for speed regulation.

A still further object of the invention is to provide a novel means for generating firing voltages for a plurality of silicon controlled rectifiers utilized in the armature supply circuit for a D.C. motor.

SUMMARY OF THE INVENTION

The present invention accomplishes the above objects by providing a motor speed control circuit utilizing the primary windings of a magnetic amplifier to control the firing angles of a pair of silicon controlled rectifiers, the primary windings being, in turn, controlled by a plurality of secondary or control windings. At least two of the control windings operate interdependently and further in cooperation with a positive feedback loop, to provide a degree of regulation heretofore unattainable.

BRIEF DESCRIPTION OF THE DRAWINGS

The foregoing and other objects and advantages of the invention will become apparent from the detailed description of a preferred embodiment thereof when read in conjunction with the drawings in which:

FIG. 1c shows the control portion of the invention including the magnetic amplifier control winding arrangement.

DETAILED DESCRIPTION OF THE DRAWINGS

Detailed description of the field circuit

Figure 1A:
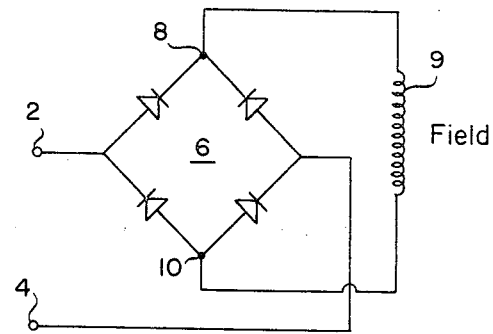
FIG. 1a shows the supply circuit for a shunt field winding of a D.C. motor.

Referring first to FIG. 1a, terminals 2 and 4 are provided, which terminals are connected to a standard 220 volt A.C. supply. The 220 volt supply is connected across a conventional diode bridge rectifier 6, the output terminals 8 and 10 of which are connected to the field winding 9 of a D.C. motor. This connection will provide a constant D.C. excitation to the field winding 9 of the D.C. motor.

Detailed description of the power supply circuit

Figure 1B:
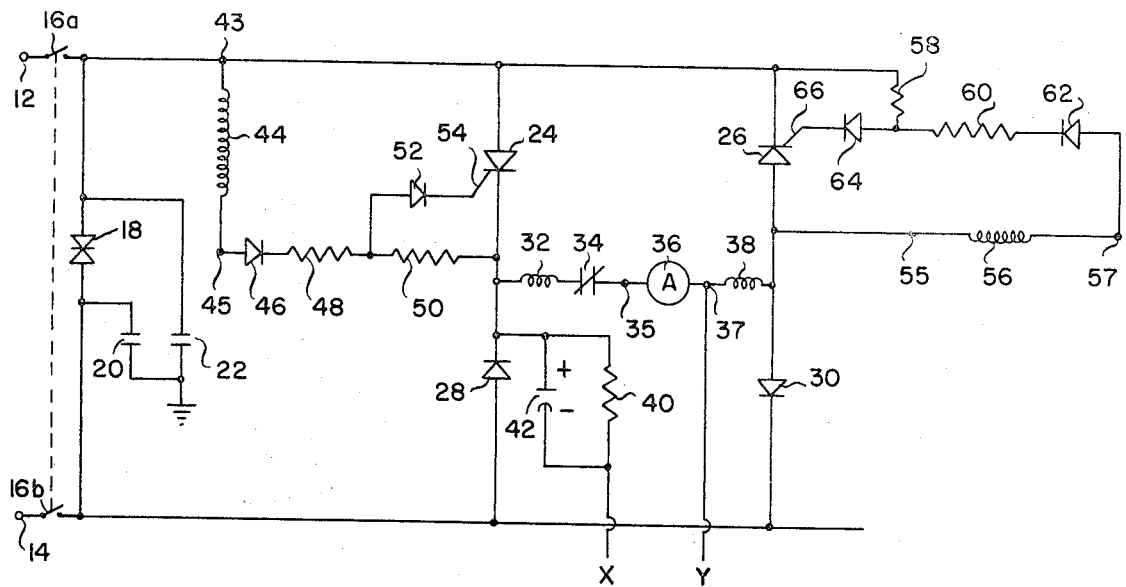
FIG. 1b shows the firing circuit for a plurality of silicon controlled rectifiers utilized for controlling the armature voltage of the motor.

In FIG. 1b, a pair of terminals 12 and 14 are connected to a conventional 220 volt A.C. power supply. A suitable switch 16a, 16b is connected across the 220 volt line to disconnect the line as desired. Across the lines 12 and 14, numbered as their respective terminals, is connected a dual diode, or thyrector, 18, each side of which is grounded through capacitors 20 and 22. The purpose of the diode and capacitors is to provide surge protection and filtering for the power supply.

The basic power supply itself consists of a pair of silicon controlled rectifiers 24 and 26 in adjacent legs of a bridge rectifier network, the remaining two legs comprising a pair of power diodes 28 and 30. The junction between SCR 24 and diode 28 is connected through an inductance 32 and a normally closed relay 34 to one terminal 35 of a motor armature 36. The junction between SCR 26 and diode 30 is connected through a second inductance 38 to a second terminal 37 of motor armature 36. Additionally, the junction between SCR 24 and diode 28 is connected through a resistance-capaciatance filter 40, 42 to a terminal X which connects to one control winding 132 of a magnetic amplifier shown in FIG. 1c, the connection and operation of which will be discussed later.

One primary winding 44 of the magnetic amplifier is connected from line 12 through a diode 46, current limiting resistor 48 and a second current limiting resistor 50 to the cathode of silicon controlled rectifier 24. Additionally, another diode 52 is connected from the junction between resistors 48 and 50 to a gate 54 of SCR 24. The anode of silicon controlled rectifier 24 is connected directly to line 12.

Similarly, a second primary winding 56 of the magnetic amplifier is connected between line 12, through current limiting resistors 58, 60 and diode 62, to the anode of SCR 26. The cathode of SCR 26 is connected directly to line 12. From the junction between resistors 58 and 60 is connected a diode 64 which provides a unidirectional current to a gate 66 of SCR 26.

Detailed description of the magnetic amplifier control circuitry

Terminals 68 and 70 in FIG. 1c are connected to the primary 74 of a transformer 72, and have a 220 volt A.C. current applied thereacross. The secondary 76 of transformer 72 is connected to the input terminals of a conventional diode bridge rectifier 78. Bridge rectifier 78 has a pair of output lines 79, 81 connected thereto, at terminals numbered in accordance with their respective lines. The output terminal 79 of diode bridge 78 is connected to a resistor 80 and a series capacitor 82 forming a conventional filtering circuit. Across capacitor 82 is connected a series of resistors including fixed resistors 84, 86 and 88 and a variable resistor 90. Between variable resistor 90 and the negative terminal of capacitor 82 is a diode 92. This series resistor chain forms a voltage dividing network, primarily for biasing of transistors, the connection and function of which will be explained later.

The junction between resistors 86 and 88 is connected to a base 94 of a transistor 100. The junction between resistors 84 and 86 is connected through a current limiting resistor 102 to a collector 96 of transistor 100. Variable resistor 90 provides the adjustment for the base bias of the transistor 100. The emitter 98 of transistor 100 is connected through a voltage limiting resistor 104 to a terminal Y, which connects through a like terminal on FIG. 1b to terminal 37 of the motor armature 36. Also connected to the emitter 98 of the transistor 100 is a capacitor 106, the negative side of which is connected to common line 81. Additionally, connected to emitter 98 of transistor 100 is a variable resistor 108 and a fixed resistor 112 which form a voltage divider network. In parallel with resistor 112 is a control winding 110 of the magnetic amplifier, the function of which winding is to compensate for motor IR losses. The negative terminal of resistor 112 and control winding 110 are connected to common line 81. Primary winding 44 is shown in this figure a dotted block, and connected to terminals 43 and 45, which terminals are also represented in FIG. 1b. The collector 96 of transistor 100 is connected through a diode 114 to a base 118 of a second transistor 116. The emitter 122 of transistor 116 is connected to common line 81. A voltage dividing resistor 117 is connected in line 79, in series with resistor 80. A control winding 124 of the magnetic amplifier is connected from common line 79 through a variable resistor 126 and a fixed resistor 128 to common line 81, at the opposite side of resistor 117. The collector 120 of transistor 116 is connected between the junction of control winding 124 and variable resistor 126. The junction between resistor 117 and control winding 124 is connected through a diode 130 to a third control winding 132 in series with a resistor 134 to common line 81. A capacitor 136 is connected from common line 81 to the junction between diode 130 and control winding 132. The junction between control winding 132 and resistor 134 is connected through a resistor 138 to a terminal X, the like lettered terminal on FIG. 1b being connected to the resistor capacitor network 40, 42. Shown again, for clarity, is primary winding 56 of the magnetic amplifier connected between common line 81 and the diode 62 in FIG. 1b, through terminals 55 and 57, also shown in FIG. 1b. The winding 56 is shown in this figure in a dotted block, to more clearly indicate the operative placement of the winding.

OPERATION OF THE POWER SUPPLY CIRCUIT

A basic power supply consists, as pointed out above, of a pair of SCR's 24 and 26 forming two legs of a bridge rectifier circuit. The two remaining legs are formed by power diodes 28 and 30. As this arrangement results in two rectifiers in series across the load, no free-wheeling diode is required to minimize fluctuations which would occur by the collapsing of the magnetic field of the armature when the SCR is cut off at the end of each cycle.

The SCR gate control is provided by means of a magnetic amplifier having two primary winding 44 and 56, and a plurality (here shown as three) of control windings. The firing angle of the SCR's is determined by the state of the saturation of the primary windings of the magnetic amplifier. The control windings determine the point at which the magnetic amplifier primary windings saturate, thereby determining when, in the A.C. cycle, the impedance will become low enough to allow a sufficient voltage at the gate terminals 54 and 66 of SCR's 24 and 26 to allow the SCR's to fire. Since the device is being operated on A.C., the SCR's are self-commutating by the occurrence of a negative half cycle to back-bias the SCR cathodes.

OPERATION OF THE CONTROL CIRCUIT

The control circuit of the invention consists essentially, of a plurality (here shown three) of control windings for a magnetic amplifier which is used to control the firing points of the silicon controlled rectifiers. The control circuitry is utilized to control the current through the three control windings, which current will, in turn, regulate the saturation or impedance of the magnetic amplifier.

Since it is desired, in this preferred embodiment, to utilize three separate controls, three control windings 124, 132 and 110 are utilized. Control winding 124 provides a positive feedback loop and winding 132 provides a negative feedback relationship to the magnetic amplifier primary windings. A second negative feedback is provided from feeding the current through motor armature 36 to the emitter of transistor 100, as will be discussed later.

In opeartion, variable resistance 126 is first set at its minimum impedance (i.e., minimum speed setting). At this setting, winding 124 will have a relatively high current (approximately 20 ma.) flowing therein. Windings 110 and 132 will have very little current flow at this setting. As variable resistance 126 is advanced, thus increasing the resistance thereof, the potential of winding 124 will be reduced, thereby reducing the current flow through that winding. When the curent flow is sufficiently reduced (i.e., approximately 14 ma.) the rising potential at the top (as shown in FIG. 1c) of winding 132 will cause a small current to flow in winding 132. At this time, a narrow firing angle of the SCR's will result, and a low D.C. energy level will be present between points 35 and 37 (i.e., across the armature of the motor). As this voltage is applied to the armature of the motor, with constant field excitation, the result will be an acceleration of the motor. As the motor accelerates, the counter EMF is applied through resistors 40 and 138 to the lower side of winding 132. This EMF will be in opposition to the driving potential at the top of winding 132, and the current flow in winding 132 will drop. The effect of this counter signal is, initially, to assist in smooth acceleration. When the desired speed has been attained, the current flow in winding 132 will be the combination of the applied signal and the counter signal. As variable resistor 126 is further increased in impedance, the current in winding 124 will be further reduced, further increasing the potential at the top of winding 132. Again, this will increase the current in winding 132, thus increasing the speed and back EMF. If a load is now applied to the motor, the armature will tend to slow down. However, the change in counter EMF caused by the load will lower the current which the counter EMF causes to appear at the bottom of winding 132, thus increasing the current flow in that winding, increasing the gain of the magnetic amplifier, and causing SCR's 24 and 26 to fire earlier in the cycle. The result will be a higher D.C. potential between terminals 35 and 37 resulting in a tendency to speed the motor up. As a practical matter, the compensation is so fast that there is little actual variation in speed from the time the motor load is applied until the corrective energizing potential is applied across the armature windings. This will hold true for speeds in excess of approximately 15 percent of the base motor speed.

As pointed out above, the extent of the control normally associated with a speed control device of this nature is provided by the negative feedback of the motor back EMF. However, due to the complex impedance which an armature presents to the driving potential, an additional control has been found to be necessary.

For this purpose, an inductance 38 is provided in series with the load. Consequently, the current flow in inductance 38 is the same as in the load. The voltage drop across the inductance is proportional to the current through it, and this voltage drop is fed back, through resistor 104 to the emitter 98 of the first transistor 100. The biasing for the transistor is provided by the resistor voltage divider 86, 88, 90. Variable resistance 90 is used to bias the base of transistor 100, and is variable in order to provide a variable turn-on control point for the transistor. Another variable resistor 108 is provided at the emitter of transistor 100, and in series with a control winding 110 in order to determine the amount of regulation used to overcome motor IR losses.

When the signal voltage at the emitter 98 is high enough to overcome the base bias, the potential at the collector 96 of the transistor 100 will, through diode 114, drive the base 118 of a second transistor 116 positive, and current in the transistor 116 will increase. Since transistor 116 is in parallel with resistors 126 and 128, the increase in current through transistor 116 will result in an increased current flow through winding 124, and a decrease in speed of the motor will result. This will maintain the torque of the motor at a desired level.

In another embodiment the control signal for the third control may be developed from a tachometer-generator coupled to the driven shaft.

As noted earlier, the setting of variable resistor 108 determines the regulation used to overcome motor IR losses. This regulation is achieved by limiting (through resistor 108) the current flowing through control winding 110. As the current through this control winding 110 increases, the tendency of the motor speed would be to decrease. Of course, the current through winding 110 would, ultimately, be determined by the armature current as picked off from inductance 38, so that the resistance of variable resistor 108 merely determines the proportion of current at the emitter 98 of transistor 100 which is to be used in the control winding 110 to vary the impedance of the magnetic amplifier primary windings.

An important provision supplied by this invention is that the control windings are interdependently controlled by all three of the variable controls applied thereto. This is in contradistinction to prior art devices in which the windings are independently controlled by various feedback signals.

OPERATION OF THE OVERALL DEVICE

Briefly, the operation of the overall device is as follows:
The operation of the field circuit (FIG. 1a) is self-explanatory, a rectified constant voltage being applied across the field winding 9 of the motor.

Initially, variable resistor 126 is set to determine the desired speed of the motor. The setting of resistor 126 will determine the amount of current initially flowing through control windings 124 and 132. As the motor armature comes up to the desired speed, a back EMF is developed across the armature, which back EMF is sensed and transmitted through resistors 40 and 138 to the lower end of control winding 132. This back EMF will serve to reduce the current through winding 132, thus tending to reduce the speed of the motor.

The control function is accomplished by the control windings varying the saturation point of the magnetic amplifier and, thereby, the point at which the magnetic amplifier will fire SCR's. As the saturation is reduced, the point at which an impedance low enough to allow firing SCR's 24 and 26 will decrease. A decrease in the potential level required to fire SCR's 24 and 26 will result in a smaller firing angle required to make the SCR's conduct. As the control winding current increases in winding 124 the saturation point of the magnetic amplifier primary windings 44 and 56 will also increase, thus allowing SCR's 24 and 26 to fire later in the cycle, thus having the net effect of lowering the energization level applied to the motor armature 36. Conversely, as the control winding current increases in winding 132, the saturation point of the magnetic amplifier primary windings 44 and 56 will tend to decrease, allowing SCR's 24 and 26 to fire earlier in the cycle, thus increasing the energization level applied to the motor armature 36.

The current through the control windings 124 and 132 is controlled in three different ways. First, the current through winding 124 is controlled by the speed setting as determined by the position of variable resistor 126. This, while controlling the current through winding 124 will also control the current through winding 132. The current through 132 is further controlled by the back EMF generated by the motor armature and fed from the power supply unit through resistors 40 and 138 back to the control winding 132. The third control is provided by sensing the armature current through inductance 38, which current is fed back to the emitter of a first transistor. As the current at the emitter overcomes the base bias of transistor 100, transistor 116 is turned on thus allowing a current to flow through the emitter-collector junction of transistor 116, thus increasing the current flow through control winding 124. Thus, are provided three separate controls for the current through these two windings.

The third control winding, as noted above, is used for varying the amount of IR compensation, by limiting the amount of feedback current from inductor 38 which is to flow through the control winding 110.

As noted above, the control arrangement as here set forth provides a degree of regulation of motor speed which was heretofore unattainable.

Actual dynamometer test results have shown a regulation of 99.1 percent, on an average, for speeds ranging from 161 r.p.m. to 1748 r.p.m. and load torque variations from 25 to 108 inch-pounds.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

I claim:
1. A speed control device for a motor armature, comprising:
   (a) a pair of controlled discharge devices, each having an anode, a cathode, and a gate, for controlling current flow in said armature,
   (b) means for sensing said current flow in said armature, and generating a first signal in response thereto,
   (c) means for sensing back EMF developed by said armature and generating a second signal in response thereto,

(d) a magnetic amplifier having two primary windings and at least two control windings,
(e) means for applying said first and second signals respectively to first and second of said magnetic amplifier control windings, said means for applying said first signal to said first control winding including a semiconductor device,
(f) means for connecting said magnetic amplifier primary windings to the gates of said discharge devices, said primary windings controlling the firing of said discharge devices,
(g) means for connecting said first and second control windings, and
(h) means for varying the current flow in said first control winding to thereby vary the current flow in said second control winding.

2. A device according to claim 1 further comprising means for varying the current flow in said second control winding to thereby vary the current flow in said first control winding.

3. In a motor speed control device having a pair of controlled-discharge devices to control the armature current in the motor, and a magnetic amplifier having two primary windings and at least two control windings, the improvement comprising:
(a) means for sensing said current in said armature and developing a first signal in response thereto,
(b) means for sensing back EMF developed by said armature and developing a second signal in response thereto,
(c) means utilizing said first and second signals to control the firing angles of said controlled-discharge devices,
(d) semiconductor means for applying said first signal to a first control winding of said magnetic amplifier, and
(e) means connecting said first control winding and a second control winding of said magnetic amplifier, thereby causing the currents in the first and second control winding to be interdependent.

4. In a speed control device for a motor armature comprising controlled-discharge means for controlling the flow of current in said armature in response to control signals derived from the primary windings of a magnetic amplifier, said amplifier including two primary windings and at least two control windings, and sensing means for supplying said control windings with control signals indicative of the condition of said motor, the improvement comprising:
(a) said sensing means providing first and second control signals respectively indicative of the amount of current flowing in said armature and the back EMF developed by said armature, for application to said control windings, and
(b) means interconnecting said two control windings for causing the current in one control winding to be interdependent with the current in the other control winding.

References Cited

UNITED STATES PATENTS

| | | | |
|---|---|---|---|
| 3,176,209 | 3/1965 | Cappello | 318—308 |
| 3,222,585 | 12/1965 | Lobb | 318—331 |
| 3,283,234 | 11/1966 | Dinger | 318—331 |

ORIS L. RADER, Primary Examiner

T. LANGER, Assistant Examiner

U.S. Cl. X.R.

318—331, 345